Jan. 3, 1950     C. C. S. LE CLAIR     2,493,490
LUBRICATING SYSTEM
Filed Nov. 22, 1944
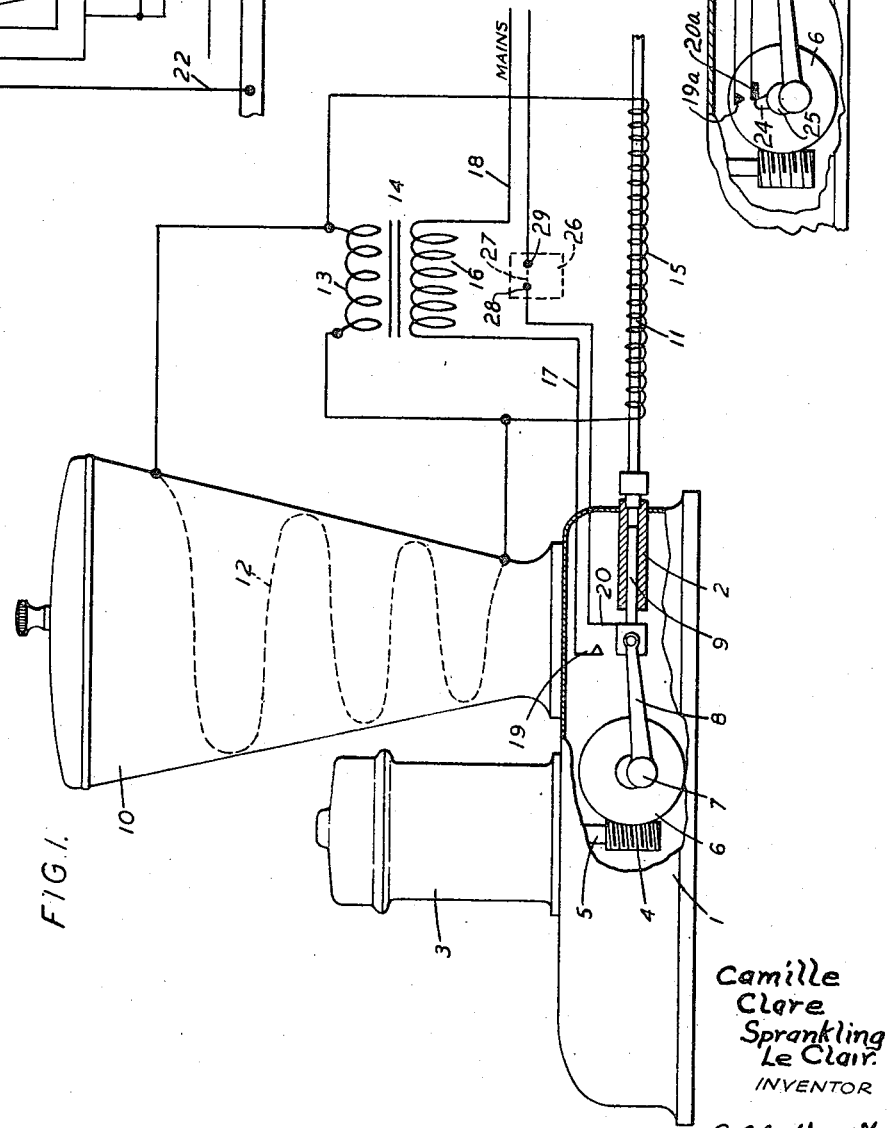
Camille Clare Sprankling Le Clair.
INVENTOR
BY McCaleb, Wendt, + Dickinson
ATTORNEY Patented Jan. 3, 1950

2,493,490

UNITED STATES PATENT OFFICE 2,493,490

LUBRICATING SYSTEM

Camille Clare Sprankling Le Clair, Acton, London, England, assignor to Tecalemit Limited, Brentford, England, a corporation of Great Britain Application November 22, 1944, Serial No. 564,681
In Great Britain December 6, 1943

6 Claims. (Cl. 184—104)

This invention relates to lubricant or like distribution or supply systems or apparatus in which grease or heavy viscous oil, hereinafter referred to as "grease," is forced either continuously or intermittently through pipes from a supply source to a place or places of use.

One of the limitations to such systems or apparatus is the high pressure required to overcome the resistance to the flow of the grease which, when the pipes are long and of small bore, may become very high. A further limitation is caused by the resistance to flow or grease from bulk containers. If, for instance, the grease does not flow by gravity to the suction side of the grease pump which supplies the pipes with grease, the pump cannot operate.

It is well known that the resistance to flow of grease is greatly reduced by raising its temperature, and attempts to overcome the difficulty have been made by providing the pipes through which the grease is pumped and (or) the container in which it is held with steam or hot water jackets. These methods, however, are crude and wasteful because, not only is it extremely difficult to adjust the amount of heat supplied to the net amount required, but the provision of such heat from an external source is often inconvenient and involves the additional expense of installation and attention during operation. Further, the prolonged application of too much heat is detrimental to the grease.

The object of the present invention, therefore, is to overcome the above mentioned difficulties and to provide a grease distribution or supply system or apparatus wherein the heat may be conveniently supplied in correctly controlled quantities to suit requirements and wherein the heat is automatically shut off at all times when not required.

According to this invention, therefore, a grease distributing or supply system or apparatus is characterised by the feature that the grease distributing pipe or pipes and (or) the grease container or containers are "flash" heated by heat applied in short intermittent impulses or flashes and sufficient to soften the surface layer of the grease in contact with the pipe or container internal surfaces but not to heat throughout the whole volume of grease contained in the pipe or container to any substantial degree.

Thus, the surface layers only of the grease are heated sufficiently to cause the bulk of the grease to slide freely but the whole bulk is not heated throughout. If the small amount of heat required were supplied continuously it would result in the whole bulk being gently heated and this does not serve the purpose aimed at. According to this invention, a comparatively large amount of heat is provided for a short period in order to effect a quick softening of the surface layer of the grease. The heat is then shut off for a period and, when the effect of heating has been largely or wholly lost, the cycle is repeated.

The most convenient way of applying heat in short impulses is by electricity which is applied in short intermittent impulses or flashes.

In the case of pipes, a pipe carrying the grease may be arranged to form part of the secondary circuit of a step down transformer, the primary circuit of which is connected to any convenient electrical supply source, such as ordinary mains, and is arranged to be switched on and off by the grease pump or by such other part of the apparatus as may be convenient. In this manner, an instantaneous electrical impulse will be sent through the pipe at every stroke of the pump or at such timed interval as may be predetermined.

Alternatively, the pipe may be heated by means of a resistance coil or tape, laid along the pipe or wound spirally around it. In either case the pipe may be heated at or about the moment when the grease is being constrained to move under the influence of the pump. At all other times during the pump cycle and also during intervals between the operation of the system or apparatus, the pipe will remain unheated, thus conserving electrical energy.

In the case of containers, it will generally be inconvenient to make the container itself form part of an electrical circuit and, therefore, we may use a continuous resistance tape or coil or separate heater elements suitably placed with respect to the container to ensure that the heat applied to the container walls will cause the mass of the grease contained in the container to slide downwards to the outlet or to the pump suction as the case may be. The resistance tape or coil or the heater elements may be connected to the secondary circuit of the transformer.

Three constructional forms of the invention each applied to grease supply or distributing apparatus including a grease supply container, a grease supply pipe and a reciprocating pump for withdrawing grease from the container and forcing it into the pipe, are hereinafter described, by way of example, with reference to the accompanying drawings, whereon:

Fig. 1 is a diagrammatic view of one construction in which the heating of the grease is carried out by electrical means including a step-down transformer, the secondary circuit of which is connected to heater coils arranged around the container and the grease supply pipe;

Fig. 2 is a fragmentary view of a modified construction in which the grease in the container is heated by a number of heater boxes connected to the secondary circuit of the transformer and in which the grease supply pipe itself forms part of the secondary circuit; and Fig. 3 is a fragmentary sectional view of the pump mechanism showing a modification of the contact operating portion thereof.

Referring to Fig. 1:

The grease pumping unit shown in Fig. 1 comprises a base 1 upon which is mounted a reciprocating pump 2 which is driven by a motor 3 through a worm drive comprising a worm 4 fixed on the motor shaft 5 and engaging with a worm wheel 6. The latter carries a crank pin 7 which is connected by a connecting rod 8 to the outer end of the pump plunger 9. Through a suction connection (not shown in the drawing) the plunger 9 draws grease from a hopper 10 mounted upon the base 1 into the pump cylinder and on its discharge stroke forces the grease into a grease supply pipe 11.

A resistance coil or tape 12 is wound spirally around the outside or inside of the hopper 10, its ends being respectively connected to the low tension winding 13 of a step-down transformer 14. A resistance coil or tape 15 is also wound around the grease discharge pipe 11 and its ends connected to the low tension winding of the transformer. The ends of the high tension winding 16 of the transformer are respectively connected by leads 17 and 18 to a fixed contact 19 and to one side of the mains and the opposite side of the mains is connected to a contact 20 which is movable with the grease pump plunger 9, the contacts 19 and 20 thus forming a make and break switch.

In the construction shown in Fig. 1, the switch is closed at or near the end of each suction or out-stroke of the plunger 9 when the movable contact 20 engages with the fixed contact 19. When this occurs, current from the mains flows through the high tension winding 16 of the transformer and a pulse of low tension current flows from the low tension winding 13 through the resistance coils or tapes 12 and 15 respectively surrounding the hopper 10 and the pipe 11. The heat thus generated in the coils or tapes 12 and 15 serves to warm the outer layer of the grease in the hopper 10 and pipe 11.

It will be obvious that instead of arranging for the switch to be opened and closed at or near the end of the suction stroke of the pump, the same effect could be obtained by closing the switch at or near the end of the discharge stroke or at some other position in the pump cycle, in which latter case the switch could be operated by a cam on the crankshaft or by other mechanism not directly connected with the pump plunger.

Accordingly, in referring to Fig. 3 a cam 24 is provided on the crank shaft 25 to operate the contacts 19a and 20a to open and close the switch.

Further, a time switch 26 of a known kind may be used in conjunction with the contacts 19—20 of the switch disclosed in Fig. 1 and hereinbefore described, or, with the contacts 19a—20a of the cam operated switch disclosed in Fig. 3, hereinbefore described, the arrangement being such that after the contacts 19—20 or 19a—20a have closed, the time switch 26 will remain closed until it is automatically opened by its own self-contained timing device, after which it cannot be closed again until the contacts 19—20 or 19a—20a have been opened and then re-closed. This arrangement has the advantage that the period of closed contact, i. e., of heating impulse, is constant irrespective of the pump speed, and, further, should the apparatus be shut down while the contacts 19—20 or 19a—20a are closed, a current will not flow continuously through the heating coils.

In the event the time switch 26 is not used, the line 27 is placed between the terminals 28—29. If the time switch 26 is used, the line 27 is omitted and the terminals 28—29 will become the terminals of the time switch. Accordingly, the line 27 and the time switch 26 are shown in dotted lines, thereby showing two alternative constructions, that is to say, one without the time switch and one with the time switch.

Fig. 2 shows a modification of the construction shown in Fig. 1, in which a number of small electric heater boxes 21 are arranged on the outside of the grease hopper 10A, each of these boxes being connected to the low tension winding of the transformer 14. In this illustration also an alternative method of heating the discharge pipe is shown, the heater coil or tape 15 surrounding the grease discharge pipe 11, Fig. 1, is omitted and leads 22 and 23 from the low tension winding of the transformer are connected directly to the pipe 11A, which latter thus becomes a part of the low tension circuit and thus itself acts as a heater element.

It will be appreciated that the spiral heater coil or tape 12 and the heater boxes 21 may be arranged inside the grease supply hopper and that spiral coils or tapes or heater boxes may also be arranged both inside and outside the hopper. Heater boxes may also be used in association with heater coils or tapes. Further, the continuous heater coils or tapes surrounding the hopper and the grease supply pipe may be replaced by separate but electrically connected coils or tapes arranged lengthwise or otherwise on the hopper or pipe.

Use may be made of containers and pipes of laminated constructions composed of materials (e. g., metals) of different electrical conductivity, the lamina in contact with the grease having higher conductivity than the remainder of the container or pipe thickness. Thus, the greater part of the current passes through the said lamina and heats it to a higher degree than the remainder, the heating effect being thereby confined to the lamina immediately in contact with the grease.

Such a laminated construction could, for example, be produced by copper plating a steel container or tube.

The heated pipes and (or) containers may be covered with a covering of electrical and heat insulating materials and these may form two separate coverings, one on top of the other or one covering may be applied to serve both purposes.

It will be appreciated that the invention is not limited in its application to systems or apparatus for supplying or distributing lubricants, but that it is applicable to the supply or distribution of other greases as well.

I claim:

1. A lubricating system adapted to the use of grease having a consistency normally too heavy to flow freely and comprising, in combination, a grease container for holding a supply of said grease, a pipe through which grease from the container is dispensed, a mechanism including a pump for forcing grease from the container and through the pipe, heating elements for applying heat to the inner surface of the container to radiate heat inwardly from the surface of the container, and means intermittently and periodically operated and timed by said mechanism for periodically heating said heating elements during the operation of said mechanism, the heating periods of the heating elements being so related to the rate of forcing grease from said container by the mechanism that only portions of the grease adjacent the surface of the container are sequentially heated.

2. A lubricating system adapted to the use of grease having a consistency normally too heavy to flow freely and comprising, in combination, a grease container for holding a supply of said grease, a pipe through which grease from said container is dispensed, a mechanism including a pump for forcing grease from the container and through the pipe, a heating element for applying heat to the inner surface of the container and radiating heat inwardly from the surface of the pipe, and means intermittently and periodically operated by said mechanism for energizing said heating element in a series of periodic pulses while the said mechanism is operating, the timing of the heat pulses of the heating element being related to the rate of forcing grease from the container by the operation of said mechanism so as sequentially to heat only portions of the grease adjacent the surface of the pipe.

3. A lubricating system adapted to the use of grease having a normal consistency which is too heavy readily to flow and comprising, in combination, a grease container, a pipe through which grease from the container is dispensed, a mechanism including a pump for forcing grease from the container through the pipe, an electrical heating element distributed over the surface of said container for applying heat to the inner surface of the container, contacts operated by said mechanism during operation of the pump for effecting a series of periodic current pulses through the heating element, the rate of said pulses being determined by the speed of operation of said mechanism, and the intensity, rate and duration of said pulses being predetermined to soften only the portion of the grease near the surface of the container.

4. In a lubricating system adapted to the use of relatively heavy grease, the combination comprising a grease carrying part, a pump for moving grease in said part, heating elements distributed over the surface of said part for applying heat to the inner surface of the part to radiate heat inwardly of the part to the grease, means for intermittently energizing the heating elements for successive short periods during the operation of the pump to heat and soften only the grease adjacent the interior of the part, and a self-operating time switch for limiting the interval of operation of said heating elements at any one time.

5. In a lubricating system adapted to the use of relatively heavy grease, the combination comprising a grease carrying part, a pump for moving grease in said part, heating elements comprising a plurality of separated heater units secured in distributed relationship to the outer surface of said part for applying heat to the inner surface of the part to radiate heat inwardly of the part to the grease, and means for intermittently energizing the heating elements for successive short periods during the operation of the pump to heat and soften only the grease adjacent the interior of the part.

6. In a lubricating system adapted to the use of relatively heavy grease, the combination comprising a grease carrying part, a pump for moving grease in said part, heating elements distributed over the surface of said part for applying heat to the inner surface of the part to radiate heat inwardly of the part to the grease, and means comprising a cam actuated contact driven by said pump for intermittently energizing the heating elements for successive short periods during the operation of the pump to heat and soften only the grease adjacent the interior of the part.

CAMILLE CLARE SPRANKLING LE CLAIR.

REFERENCES CITED

The following references are of record in the file of this patent:

UNITED STATES PATENTS

| Number | Name | Date |
| --- | --- | --- |
| 1,129,187 | Fleming | Feb. 23, 1915 |
| 1,783,611 | Gohring | Dec. 2, 1930 |
| 1,929,231 | Yirava | Oct. 3, 1933 |
| 1,933,403 | Wilson | Oct. 31, 1933 |
| 1,977,831 | Marshall | Oct. 23, 1934 |
| 1,982,325 | Shepherd | Nov. 27, 1934 |
| 2,288,248 | Long | June 30, 1942 |

FOREIGN PATENTS

| Number | Country | Date |
| --- | --- | --- |
| 15,492 | Great Britain | 1892 |